(12) United States Patent
Peterson

(10) Patent No.: US 7,395,998 B2
(45) Date of Patent: Jul. 8, 2008

(54) PICTURE HANGER FOR USE WITH GYPSUM BOARD

(75) Inventor: Francis C. Peterson, Spooner, WI (US)

(73) Assignee: Nesson Enterprises, Decorah, IA (US)

( * ) Notice: Subject to any disclaimer, the term of this patent is extended or adjusted under 35 U.S.C. 154(b) by 216 days.

(21) Appl. No.: 10/538,812

(22) PCT Filed: Dec. 12, 2003

(86) PCT No.: PCT/US03/39974

§ 371 (c)(1),
(2), (4) Date: Dec. 7, 2005

(87) PCT Pub. No.: WO2004/054405

PCT Pub. Date: Jul. 1, 2004

(65) Prior Publication Data

US 2006/0134375 A1    Jun. 22, 2006

Related U.S. Application Data

(60) Provisional application No. 60/433,127, filed on Dec. 13, 2002.

(51) Int. Cl.
*A47G 1/20* (2006.01)

(52) U.S. Cl. .................... 248/489; 248/497; 248/218.2; 428/100

(58) Field of Classification Search ................. 428/100; 248/489, 497, 218.2, 493
See application file for complete search history.

(56) References Cited

U.S. PATENT DOCUMENTS

| 1,210,610 | A | 1/1917 | Dehn |
| 6,830,228 | B2 * | 12/2004 | Ernst ........................ 248/475.1 |
| D515,911 | S | 2/2006 | McDuff |
| D516,412 | S | 3/2006 | McDuff |

OTHER PUBLICATIONS

International Search Report for PCT/US2003/039974 Jul. 16, 2004.

* cited by examiner

*Primary Examiner*—Alexander Thomas
(74) *Attorney, Agent, or Firm*—Fitch, Even, Tabin & Flannery

(57) ABSTRACT

A picture hanger for use with gypsum board comprises a strip of steel bent into a V to provide two legs. The first leg is arcuate and functions as an anchor upon insertion into the gypsum board. The second leg is straight, with a hook at its terminus for hanging pictures and the like. An installation tool is provided which enables the arcuate anchor leg to be driven into the gypsum board along an arcuate path corresponding to the arcuate anchor leg until the second leg is held firmly against the surface of the gypsum board.

3 Claims, 3 Drawing Sheets

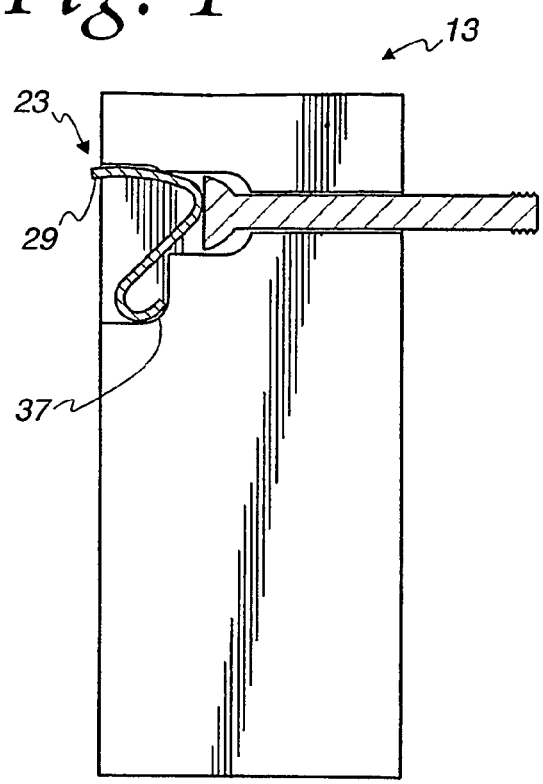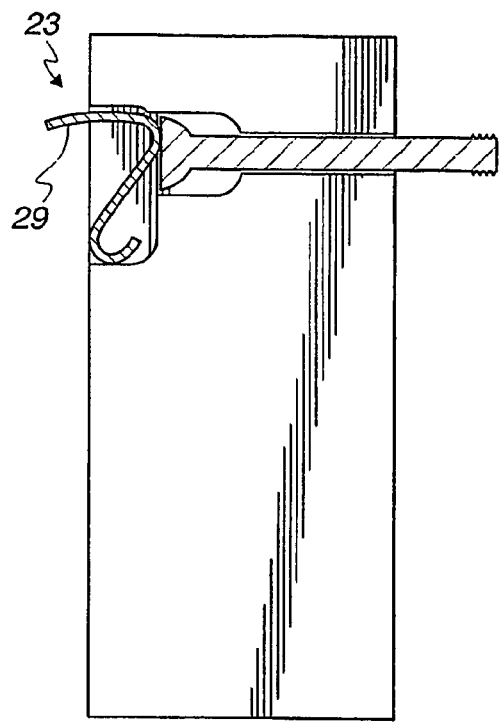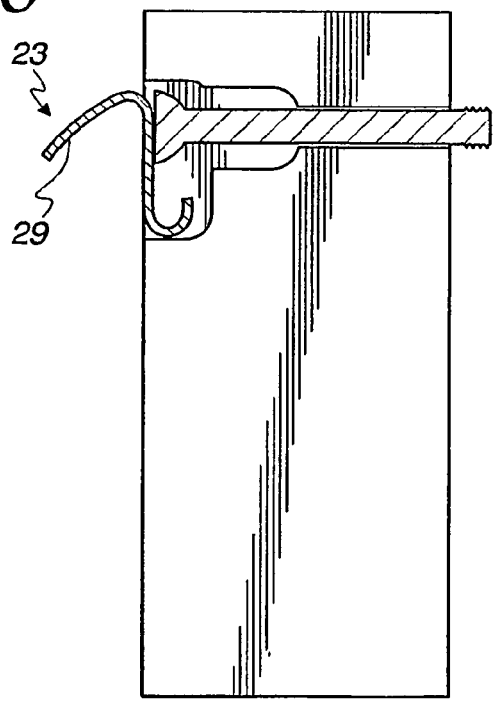

PICTURE HANGER FOR USE WITH GYPSUM BOARD

CROSS REFERENCE TO RELATED APPLICATIONS

This application is based on Provisional Application Ser. No. 60/433,127, filed Dec. 13, 2002.

FIELD OF THE INVENTION

The present invention relates generally to a hanging fixture or hook for installation in gypsum board from which pictures, mirrors, and the like are hung. More particularly it relates to a hook for installation in gypsum board which is removable without substantial damage to the gypsum board surface.

BACKGROUND OF THE INVENTION

The use of gypsum board (drywall) for interior walls and ceilings of buildings is ubiquitous. Walls and ceilings may be finished in a fraction of the time required for lath and plaster finishing.

Along with its many advantages, gypsum board has severe limitations with respect to its ability to support pictures, mirrors and the like. Unless a hanger is positioned directly over a stud, into which screws or nails may be driven, special fixtures are required. A common solution is to drill a hole through the board, insert an appropriately sized plastic or fiber anchor into the hole, and drive a screw into the anchor. Other devices include a self-drilling anchor which cuts its own hole and screws into the board. Yet other hangers use a nail driven downwardly into the board at an acute angle from which a hook is suspended.

All of the prior art fixtures and hangers have disadvantages. Drilling a hole in gypsum board produces fine white dust, which must be cleaned up after installation is complete. Moreover, if the fixture is removed, a scar is left in the wall which requires patching with dry wall compound or plaster of paris followed by sanding and painting. In general, installing or removing the hanging fixtures of the prior art is a messy job.

GENERAL DESCRIPTION OF THE INVENTION

In accordance with the present invention, there is provided a steel strip bent into a Vee to provide two legs. The first leg is arcuate and functions as the anchor when inserted into gypsum board. The second leg is straight, with a hook at its terminus for hanging pictures and the like. An installation tool is provided which enables the arcuate anchor leg to be driven into the gypsum board along an arcuate path until the second leg is held firmly against the surface of the gypsum board. The hanger may be removed with a screw driver or plier, leaving a barely perceptible scar in the gypsum board.

DETAILED DESCRIPTION OF THE INVENTION

The construction and installation of the device of the present invention will become readily apparent from the following description and drawing, in which:

FIG. 4 is a cross-sectional view taken along lines 2-2 of FIG. 2 showing the hanger in nesting position in the installation tool before insertion into the gypsum board;

FIG. 5 is a view like FIG. 4 in which the hanger has been partially driven into the gypsum board;

FIG. 6 is a view like FIG. 4 showing the hanger fully inserted in the gypsum board;

Figure 1:
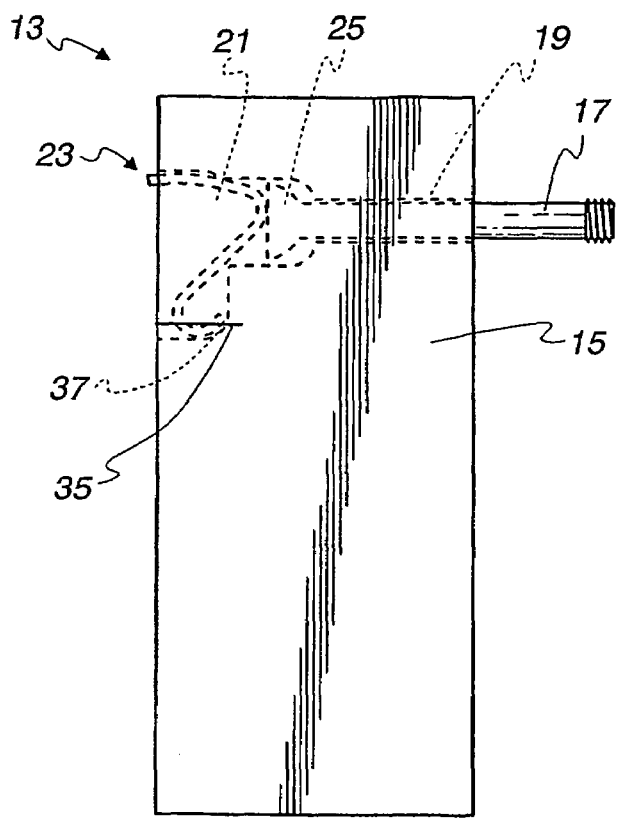
FIG. 1 is an elevational view of the installation tool in accordance with the present invention with a hanger positioned therein.
Figure 2:
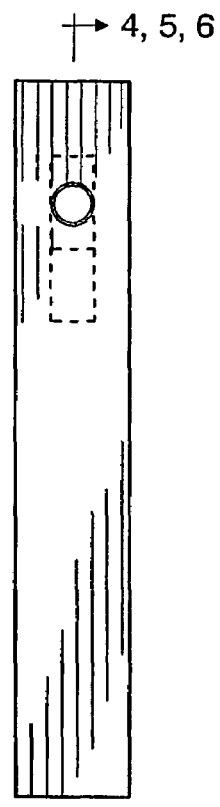
FIG. 2 is a side view of the installation tool of FIG. 1.

As shown in FIG. 1 there is provided an installation tool 13 comprising a body 15 and a driver 17. The body 15 may be made of an injection molded plastic. The driver 17 preferably is a steel rod received in a bore 19 in the body 15. The bore 19 opens into a cavity 21 formed to accommodate the hanger 23 of the present invention.

The driver 17 terminates in the interior of the body with a push plate 25. The push plate abuts the hanger 23. The hanger is shown more particularly in FIG. 3, and is bent into a Vee, with an anchor leg 29 and a hanger leg 31. The hanger leg terminates in a hook 33.

Figure 3:
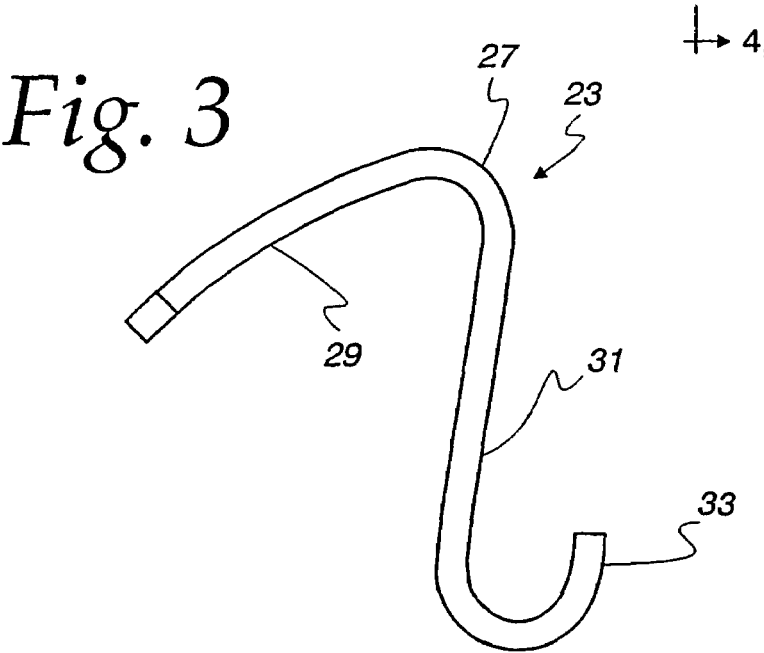
FIG. 3 is an enlarged side view of the hanger.

It will be seen in FIG. 3 that the anchor leg 29 of the hanger 23 is arcuate, with the center of curvature of its arc at or near the base of the hook 33 of the hanger leg.

FIG. 4 shows the installation tool 13 and the hanger 23 in the same position as illustrated in FIG. 1, before insertion of the hanger into the gypsum board. A guide line 35 (FIG. 1) on the side of the installation tool body 15 is aligned with the spot where the hook 33 is desired to be positioned on the wall.

FIG. 5 shows the hanger 29 partially driven into the gypsum board. A hammer is used to strike the end of the driver 17 to drive the anchor leg 29 of the hanger progressively into the gypsum board. Throughout insertion of the hanger 23, the hook 33 of the hanger leg 31 is captured between a shoulder 37 of the cavity 21 and the surface of the wall, so that the anchor leg 29 of the hanger 23 follows an arcuate path into the wall consistent with the arc of the anchor leg 29.

FIG. 6 shows the anchor leg 29 fully inserted into the gypsum board, so that the hanger leg 31 of the hanger 23 is urged snugly against the surface of the gypsum board.

If it should happen that the hanger 23 is mistakenly placed in the wrong location, or if the hanger is no longer needed, the hanger 23 may be easily removed from the gypsum board using a screw driver and/or a plier to urge the anchor leg upwardly and outwardly away from the gypsum board. Upon removal, the point of entry of the hanger 23 into the wall is barely discernable. If desired, a very small amount of spackle or drywall compound of course may be used to camouflage it.

Figure 7:
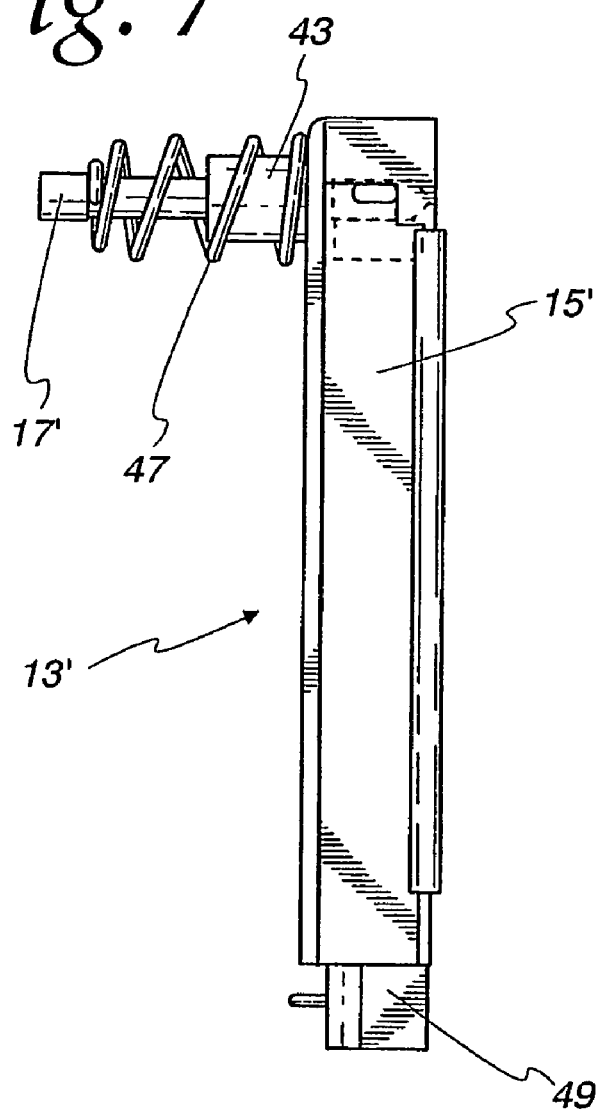
FIG. 7 is an elevational view of an alternative embodiment of the installation tool.
Figure 8:
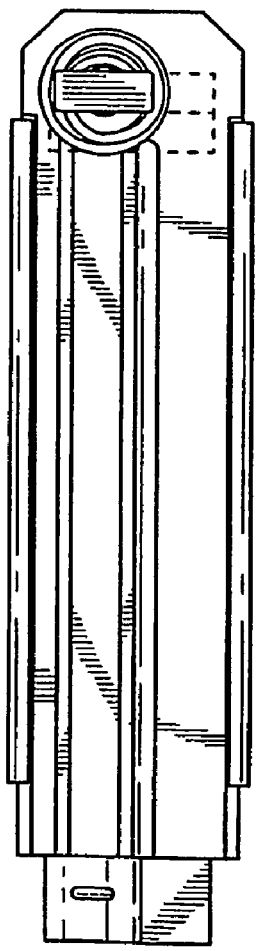
FIG. 8 is a side view of the installation tool of FIG. 7.

FIG. 7 shows an alternative embodiment 13' of the installation tool. It includes a driver 17' received in a guide tube 43 affixed to the body 15' of the installation tool. A compression spring 47 biases the driver 17' away from the body 15'.

The body 15' encloses a magazine in which a plurality of hangers 23 are loaded. A follower 49 urges the hangers toward the end of the body underlying the driver 17'. In this respect, the body 15' resembles the body of a stapler, in which a plurality of staples are urged toward the inserting means.

In a further embodiment of the installation tool (not illustrated) the driver is electrically driven, as in an electric stapler, to insert the hangers 23 into the gypsum one at a time.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A fixture for insertion into a gypsum board wall to enable articles to be hung therefrom, comprising:
   a Vee-shaped metal fixture having a first leg and a second leg, said first leg functioning as an anchor and said second leg functioning as a hanger;
   said second leg terminating in a hook; and
   said first leg being arcuate with a center of curvature substantially at the center of curvature of said hook.

2. The fixture of claim 1 wherein the fixture is formed from a steel strip.

3. A fixture for insertion into a gypsum board wall to enable articles to be hung therefrom, comprising:
   a metal fixture having a first leg and a second leg which together form a Vee;
   said first leg functioning as an anchor for insertion into the wall and said second leg having a hook formed therein adjacent its terminus from which the articles may be hung;
   said first leg being arcuate with the center of curvature of its arc being at or near the base of the hook of said second leg.

* * * * *